US006816607B2

(12) United States Patent
O'Donnell et al.

(10) Patent No.: US 6,816,607 B2
(45) Date of Patent: Nov. 9, 2004

(54) SYSTEM FOR MODELING STATIC AND DYNAMIC THREE DIMENSIONAL ANATOMICAL STRUCTURES BY 3-D MODELS

(75) Inventors: Thomas O'Donnell, Engelwood, NJ (US); Alok Gupta, East Brunswick, NJ (US); Marie-Pierre Jolly, Belle Mead, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 414 days.

(21) Appl. No.: 09/858,368

(22) Filed: May 16, 2001

(65) Prior Publication Data

US 2002/0172407 A1 Nov. 21, 2002

(51) Int. Cl.⁷ .......................... G06K 9/00; G06T 17/00
(52) U.S. Cl. ....................................... 382/131; 382/154
(58) Field of Search ............................. 382/128, 131, 382/154, 285; 345/420

(56) References Cited

U.S. PATENT DOCUMENTS

| | | | |
|---|---|---|---|
| 4,873,707 A | 10/1989 | Robertson | 378/18 |
| 5,360,006 A | 11/1994 | Geiser et al. | 128/653.1 |
| 5,435,310 A | 7/1995 | Sheehan et al. | 128/653.1 |
| 5,517,602 A | 5/1996 | Natarajan | 395/119 |
| 5,570,430 A | 10/1996 | Sheehan et al. | 382/128 |
| 5,633,951 A * | 5/1997 | Moshfeghi | 382/154 |
| 5,689,577 A | 11/1997 | Arata | 382/128 |
| 5,782,762 A | 7/1998 | Vining | 600/407 |
| 5,795,296 A | 8/1998 | Pathak et al. | 600/443 |
| 5,871,018 A * | 2/1999 | Delp et al. | 128/898 |
| 5,889,524 A * | 3/1999 | Sheehan et al. | 345/419 |
| 5,920,319 A | 7/1999 | Vining et al. | 345/420 |
| 5,923,770 A | 7/1999 | O'Donnell et al. | 382/131 |
| 5,988,862 A | 11/1999 | Kacyra et al. | 364/578 |
| 6,084,590 A | 7/2000 | Robotham et al. | 345/419 |
| 6,106,466 A | 8/2000 | Sheehan et al. | 600/443 |
| 6,201,543 B1 | 3/2001 | O'Donnell et al. | 345/420 |
| 6,295,464 B1 * | 9/2001 | Metaxas | 600/407 |
| 6,563,941 B1 * | 5/2003 | O'Donnell et al. | 382/131 |

OTHER PUBLICATIONS

Ronal Chang et al., Using 2D Active Contour Models for 3D Reconstruction from Serial Sections, IEEE, 1996, pp. 849–853.*

Laurent D. Cohen et al., A Finite Element Method Applied to New Active Contour Models and 3D Reconstruction from Cross Sections, IEEE, 1990, pp. 587–591.*

Mortensen, Eric N., et al., "Interactive Segmentation with Intelligent Scissors," *Graphical Models and Image Processing* 60:349–384 (1998).

(List continued on next page.)

*Primary Examiner*—Brian Werner (57) ABSTRACT

The present invention relates to a system of modeling a three dimensional target object which is represented by a plurality of cross-sectional images in order to provide a representative corresponding three dimensional model. The invention selects an initial model from a plurality of available initial models. This selection involves identifying an initial model based on physical similarity to the target object and then superimposing an initial model upon the target object, for each of the plurality of cross-sectional images. A determination is then made of an intersection contour of the initial model and a cross-sectional image of the target object and the determined intersection contour is refined in order to more closely delineate the target object. By sub-sampling points which represent the refined determined intersection contour, the invention obtains a sub-sampled contour dataset. The initial model is then adjusted towards the sub-samples contour to obtain a representative three dimensional model of the target object.

21 Claims, 9 Drawing Sheets

OTHER PUBLICATIONS

Kass, Michael, et al., "Snakes: Active Contour Models," *International Journal of Computer Vision*, pp. 321–331 (1998).

Amini, Amir A., et al., "Snakes and Splines for Tracking Non–Rigid Heart Motion," 2:251–261.

Gilles, Brassard et al., "Algorithmics Theory and Practice," *Prentice Hall*, 1988.

Geiger, Davi et al., "Dynamic Programming for Detecting, Tracking, and Matching Deformable Contours," IEEE Transactions on Pattern Analysis and Machine Intelligence, 17:3, Mar. 1995.

O'Donnell et al., "A cooperative framework for segmentation using 2D active contours and 3D hybrid models as applied to branching cylindrical structures", Proceedings of IEEE 6th Int'l Conf. on Computer Vision (IEEE Cat. No. 98CH36271), Bombay, India, Jan. 4–7, 1998, pp. 454–459.

Gupta et al., "Segmentation and tracking of cine cardiac MR and CT images using a 3–D Deformation model", Computers in Cardiology 1994 Bethesda, mD, USA Sept. 25–28, 1994, Los Alamitos, CA, USA, IEEE Comput. Soc., Sept. 25, 1994, pp. 661–664.

O'Donnell et al., "Multi–modality model–based registration in the cardiac domain", Proceedings IEEE Conf. on Computer Vision and Pattern Recognition, CVPR 2000 (Cat. No. PR00662), Hilton Head Island, SC, Jun. 13–15, 2000, pp. 790–791.

McInerney et al., "A dynamic finite element surface model for segmentation and tracking In multidimensional medical images with application to cardiac 4D image analysis", Computerized Medical Imaging and Graphics, Pergamon Press, NY, NY, vol. 19, No. 1, 1995, pp. 69–83

\* cited by examiner

SYSTEM FOR MODELING STATIC AND DYNAMIC THREE DIMENSIONAL ANATOMICAL STRUCTURES BY 3-D MODELS

BACKGROUND OF THE INVENTION:

1. Field of the Invention

The present invention relates to the computer modeling of a potentially dynamic anatomical structure in a given image volume(s). This allows for the measurement of the geometry of the underlying object at a specific point in time or over a set of time periods.

2. Description of Related Art

Temporal variation in organ morphology is frequently of interest to physicians and surgeons. In the heart, for example, the change in blood pool volume (i.e., volume difference) of the left ventricle over the cardiac cycle (i.e., the operational phases of the heart) is used to diagnose dysfunction and determine a course of treatment. Changes in the strain tensor of cardiac tissue indicate problems in underlying material properties (i.e., infarction of damaged tissue). Similarly, differential lung capacity is an effective determinant for assessing pulmonary disease. In the brain, swelling in response to injury may be tracked over a period of time to provide an indicator of severity of head trauma. In another example, disease progression such as cirrhosis is reflected in the shape of evolution of the liver (i.e., the status of the anatomical organ). Indeed, the history of tumor volume is a value scrutinized closely by doctors. For replacement actions (i.e., hip replacement) the full degree of motion of the skeletal structure must be recovered.

A method for segmenting objects from 3D images using a 3D deformable surface which was made up of a series of 2D planar curves is proposed. However, this model is not cohesive in terms of being 3-D and is more a propagation of 2-D contours in space followed by a stitching together of the contours. In addition, the 2D planar curves are not recovered via optimal active contours ("optimal" meaning that the energy function describing the contour is globally minimized). Instead, the proposed method employs snakes and relies on balloon forces to explore crevices. The problem with balloon forces is that the snake might leak where the image boundaries are not well defined. 2D deformable surfaces have also been applied to segmentation but the approaches have not been "optimal". For 1D contours, optimality is a well understood concept. How this concept might be extended to 2D surfaces still presents difficulty.

Direct application of 3D models to 3D image volumes has also met with mixed success. Again, describing deep crevices becomes a problem. Some proposed methods fit parallel sets of 2D contours to recover a 3D object. Once the fit is settled the methods repeat the process from an orthogonal direction using the results of the previous iteration as a starting point. However, these methods employ balloon forces to fit the 2Dcontours and their result is not a coherent 3-D surface model. In addition, these methods are applied on relatively simple synthetic shapes. Region growing techniques are also used for segmentation. However, while these techniques are often effective they suffer from bleeding in areas where the object boundary is not well defined. In addition, these techniques do not result in a geometric description of the object, rather they result in a collection of voxels. A voxel is a unit of graphic information that defines a point in three dimensional space (in other words, a volume pixel).

Segmentation via the propagation of 2D active contours (i.e., using the result from a previous slice as the starting point for a segmentation of the current slice) is problematic. A change in an object's circumference in a slice might be due to a change in the radius of the object under recovery, or it might be due to a change in direction of the path taken by the object in space. Determining if a change in circumference or direction has occurred is essential for selecting an appropriate starting point for segmentation in the slices to follow. Two-dimensional active contours lack the global properties necessary to account for these instances.

3-D models are powerful tools. They can provide detailed description of an object. It is difficult, however, to directly employ 3-D models in the segmentation process since they are not guaranteed to locate the optimal boundaries in cross-sectional slices. Propagating 2D active contours from slice to slice, on the other hand, to delineate an object's boundaries is effective but encounters problems when an object's shape dramatically changes such as in areas of high curvature.

A cooperative framework to exploit the positive aspects of both 3D model and 2D active contour approaches for segmentation and recovery is advantageous. In this framework, a default model shape, positioned in the data would provide starting points for a set of 2D segmentations (refinements) performed by active contours. The same model is fitted to the results of the segmentation.

Therefore, a need exists for a general cooperative approach for segmenting objects from 3D image volumes which exploits the positive aspects of both 2D and 3D traditional approaches.

SUMMARY OF THE INVENTION

The present invention relates to a system of modeling a three dimensional target object which is represented by a plurality of cross-sectional images in order to provide a representative corresponding three dimensional model. The invention selects an initial model from a plurality of available initial models. This selection involves identifying an initial model based on physical similarity to the target object and then superimposing an initial model upon the target object, for each of the plurality of cross-sectional images. A determination is then made of an intersection contour of the initial model and a cross-sectional image of the target object and the determined intersection contour is refined in order to more closely delineate the target object. By sub-sampling points which represent the refined determined intersection contour, the invention obtains a sub-sampled contour dataset. The initial model is then adjusted towards the sub-samples contour to obtain a representative three dimensional model of the target object.

BRIEF DESCRIPTION OF DRAWINGS

The invention is described in detail in the following description of preferred embodiments with reference to the following figures wherein.

DETAILED DESCRIPTION OF PREFERRED EMBODIMENTS

In the present system a method comprises quantifying the change in organ morphology using a semi-automatic segmentation method. A user approximately positions a model of the organ (or organs) in an image volume. After this, the process is fully automatic. Steps include intersecting the user-positioned model with the individual image planes of the volume to create a series of contours approximating the position of the underlying organ. Then, optimal 2-D segmentation algorithms are used to refine the boundary of the organ using the approximate contours as starting points. From these optimal contours a new model is applied. Volume and other morphometric measurements are then taken on the model. It is to be noted that in an alternative embodiment a model may be automatically positioned in an image volume.

For the case of recovering the left ventricle (LV) of the heart, for each stage of the cardiac cycle the following steps are taken: First, the approximate position of the LV is specified by the user. The approximate inner and outer boundaries are outlined with a series mouse clicks on both a short axis image as well as a long axis image, the model is automatically fit to these points. The resulting model is referred to as the initial model. Note that this model is not required to sit exactly on the boundary of the organ. It is enough that it is close to the boundary of the organ. Further, the initial model is intersected with each of the image planes in the image volume. The result is a series of contours (inner and outer) in each of the cross-sectional images of the volume. These individual contours form starting points for optimal 2-D segmentations of the LV. A new model (or the initial one) is automatically fit to these recovered contours. This procedure is then repeated for every temporal instance.

A cooperative framework includes a method for combining three dimensional (3D) models with two dimensional (2D) segmentations. In one example, a user initializes a parametric component of a hybrid model. A hybrid model is a parametric model with a spline-like mesh on its surface which is capable of deforming to describe fine detail in an image volume. Intersections of image slices with the parametric component serve as starting points for a segmentation of the object boundaries using active contours. The resulting segmentations are sampled to create a data set of 3D points to which the original hybrid model is fit. The hybrid model is free to deform both parametrically and locally in order to represent the object of interest. In this way, the user initializes the hybrid model, the hybrid model initializes the 2D active contours, and the active contours constrain the fit of the hybrid model. This fit is referred to as a physically motivated fit. The process may then be repeated for different time instances.

Figure 1:
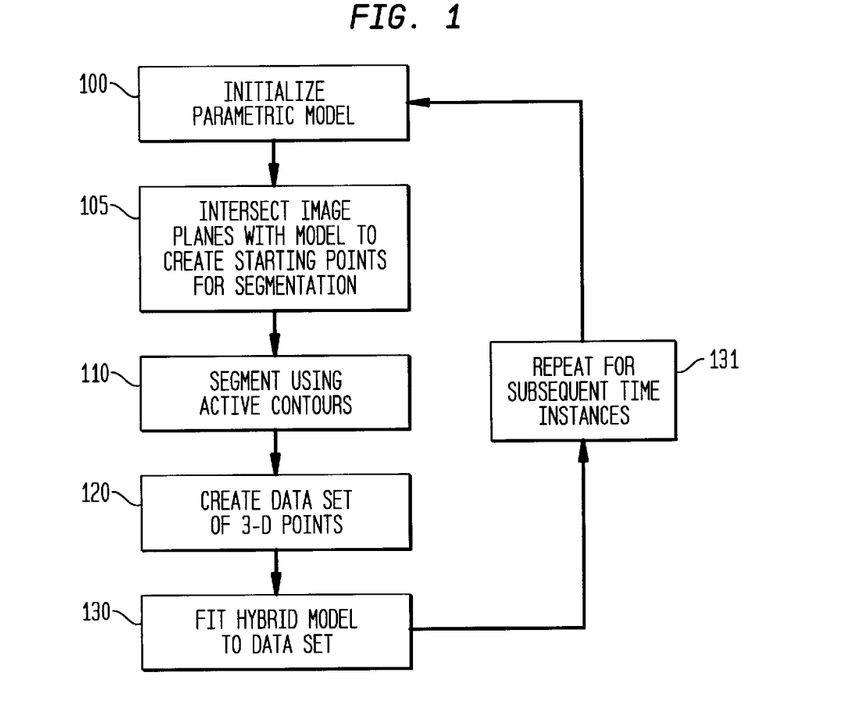
FIG. 1 is a flow diagram showing method steps and three stages of the present invention.

Referring to FIGS. 1–10 of the present invention and in particular to FIG. 1 which provides a flow chart of the method of the present invention. As described above, block 100 of FIG. 1 represents an initialization of the model. This includes taking a volumetric image of an object to be modeled. The intersection of the models with the imaging planes results in an approximation to the cross-section of the object in the image. This approximation serves as a starting point for active contour segmentations in the image, in block 105. In block 110, segmentation using active contours is performed on the object in the image. The segmented contours are used to create a data set of 3D points in block 120. In block 130, the model is fit to the data points of block 120 to represent the object. This process is repeated for subsequent time instances as shown in block 131.

Figure 2:
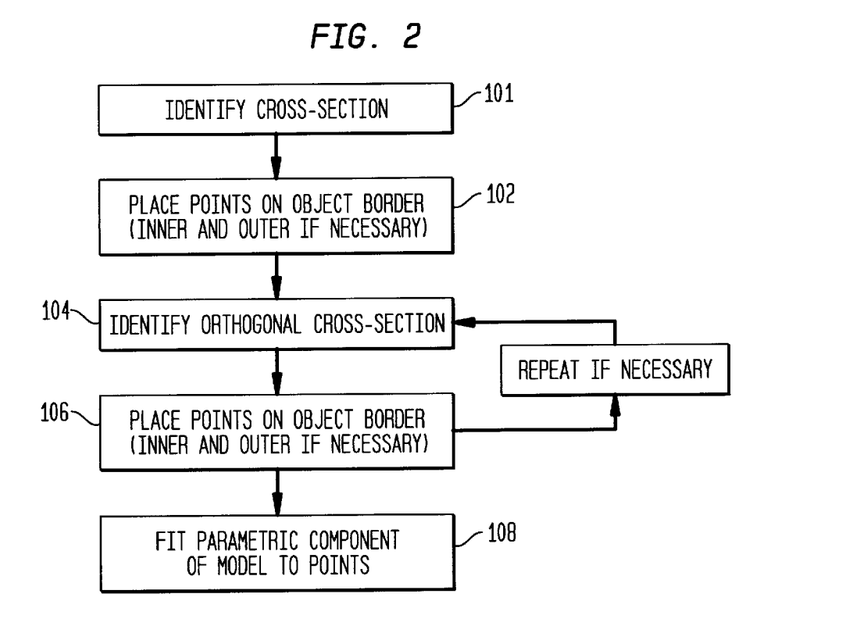
FIG. 2 is a flow diagram showing in further detail the steps of Stage 1 of FIG. 1.

Referring to FIG. 2 of the drawings, a detailed flow chart is provided for block 100 initializing the model. This step includes identifying approximate positions on the surface from at least two views which bounds the extremities of the object. In the case of the left ventricle of the heart both inner and outer walls (endocardial and epicardial) must be delineated. The approximate positions of the points on the surface of the object are identified in blocks 102 and 106. The orthogonal cross section is identified in block 104. If necessary this step is repeated after the step in block 106. A parametric component of the model is then fitted to the points as shown in block 108.

Figure 3:
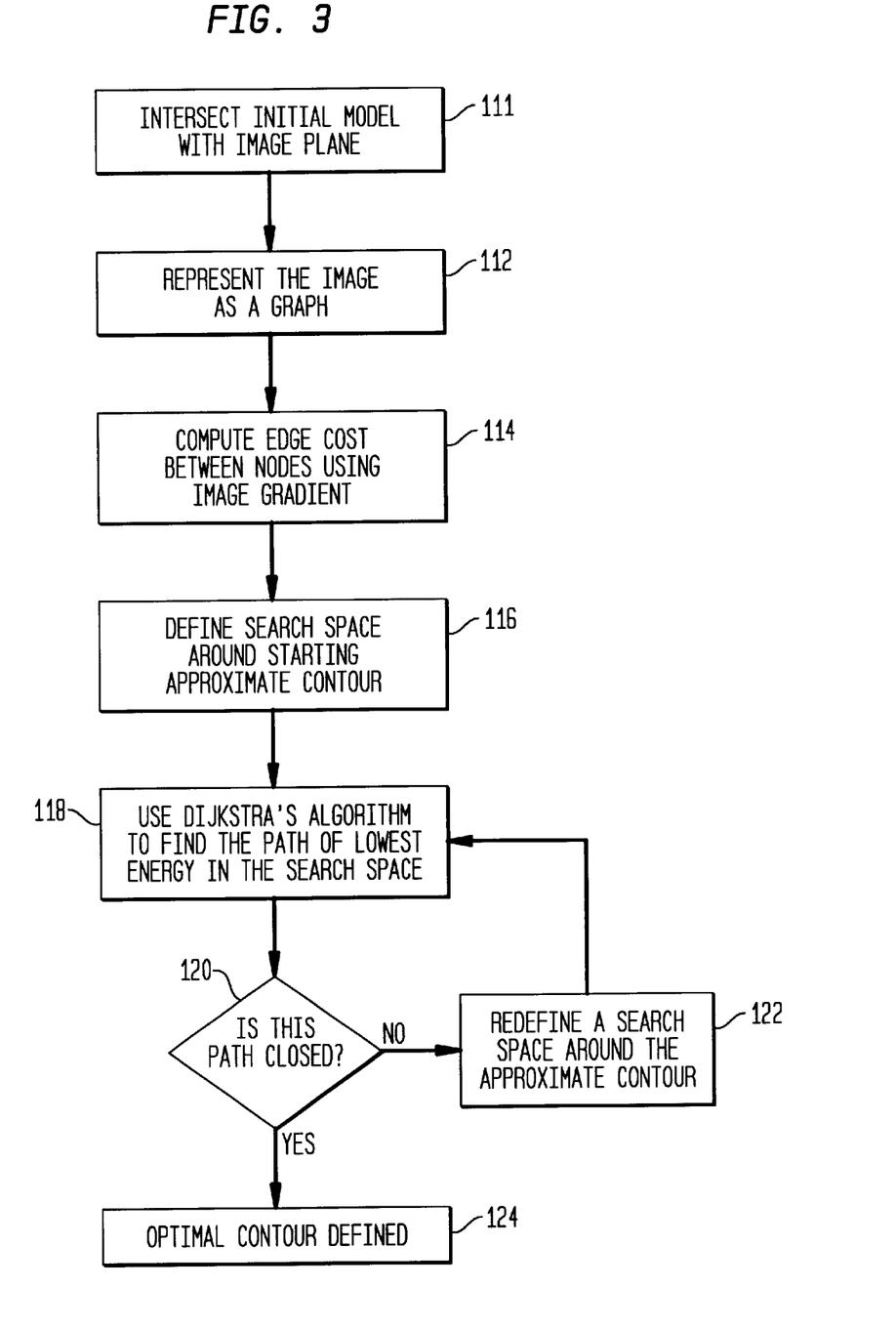
FIG. 3 is a flow diagram showing in further detail the steps of Stage 2 of FIG. 1.

Referring to FIG. 3 of the drawings, in block 111, the initial model image and, the image planes intersect. FIG. 3 of the drawings illustrates, block 105 of FIG. 1 in a detailed flowchart, in a preferred embodiment a two dimensional image is represented as a graph in block 112. These intersections are used as the starting points for 2D segmentation. The edge cost is found between graph nodes using image gradients in block 114. A search space is defined around the approximate input contour in block 116. A path of lowest energy between pixels/nodes is determined using Dijkstra's algorithm in block 118. Dijkstra's algorithm is a standard graph algorithm and can be found in any algorithm's book such as *C. G. Brassard and P. Bratley, Algorithmics: Theory and Practice, Prentice Hall*, 1988. This step is repeated for a different search space if the resulting contour is not closed in block 122. By determining the lowest energy path a contour (path) is defined in block 124.

Figure 4:
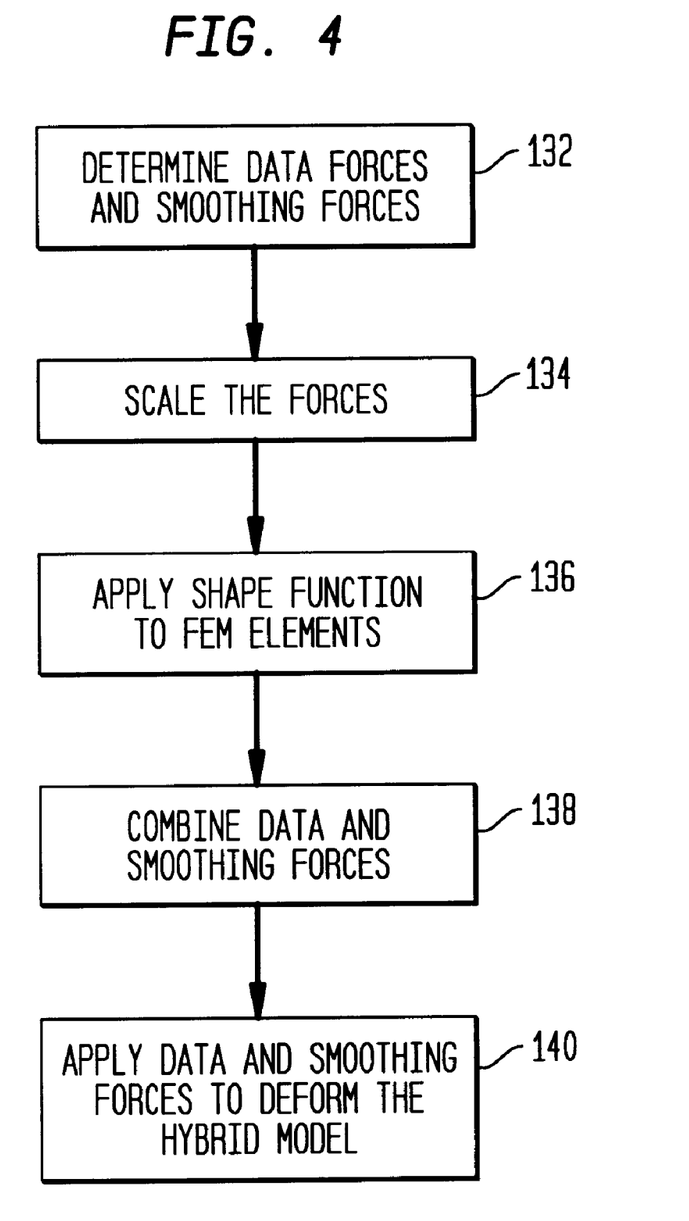
FIG. 4 is a flow diagram showing in further detail the steps of Stage 3 of FIG. 1.

FIG. 4 of the drawings is a detailed flow chart of block 110 of FIG. 1 illustrating fitting the model of block 130. This fitting of the model includes determining data and smoothing forces for the points of the data set in block 132. The data and smoothing forces are scaled in block 134. Shape functions that reduce the number of iterations needed to fit the model to the data are applied to finite element model (FEM) elements in block 136. An (FEM) is a finite element model which is made up of a finite number of elements on the surface of the model and serve to describe the model. Data and smoothing forces are combined in block 138. Applying the adjusted forces to the hybrid model to deform the hybrid model is performed in block 140.

Segmentation is among the most widely researched topics in computer vision. A comparison of the cooperative framework described in this disclosure is compared with the most closely related work. However, the method as described is applicable to other techniques and systems.

Figure 5:
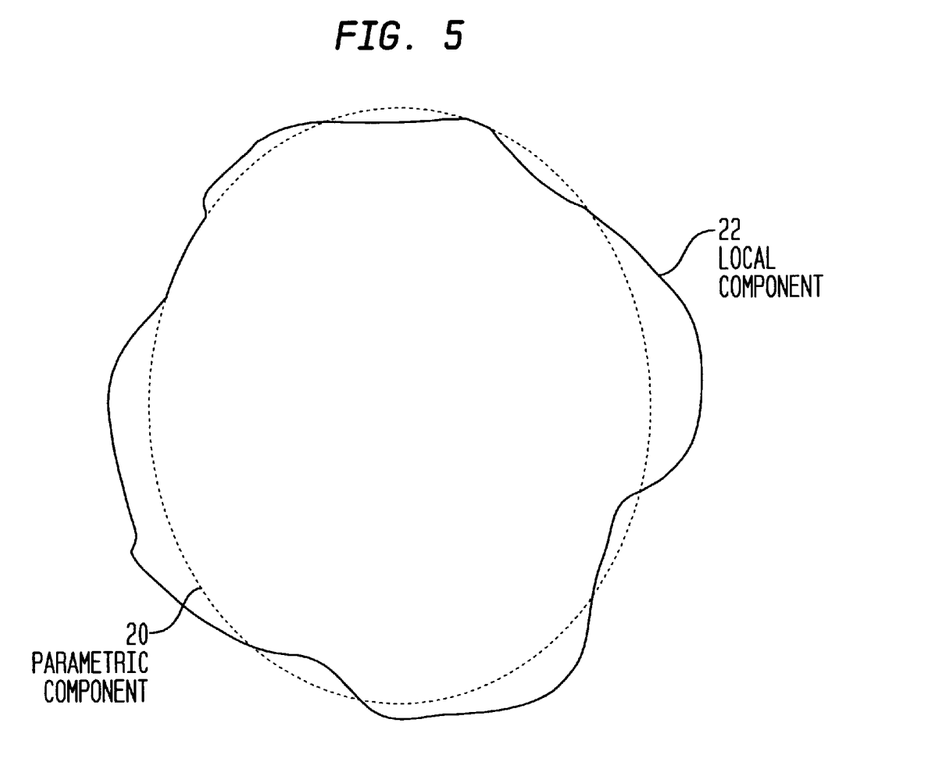
FIG. 5 is a perspective view of a portion of a hybrid model showing a parametric component and a local component.

A preferred embodiment of a hybrid 3-D model for the heart left ventricle is described in the following. It is understood that this invention is not restricted to this model only. The invention applies to any model of any object. The approach may make use of any 3D model form. In the present example the hybrid model is chosen. Referring to FIG. 5, for the use of a hybrid model of the LV, the model formulation is hybrid in that it is made up of a parametric component 20 and a local, spline-like mesh component 22 over the parametric component. This local component may deform away from the parametric surface to describe fine detail. The parametric component of the model is based on two ellipsoids, one describing the inner wall of the LV and one describing the outer wall. The model has an underlying parametric component which resembles a double hulled ellipsoid (one for the inner wall of the left ventricle and one for the outer wall). The model is broken up into octants which are described by their own parametric formulations. The quadrants are called PosPosPos, NegPosPos, NegNegPos, PosNegPos, PosPosNeg, NegPosNeg, NegNegNeg, PosNegNeg with representations for the inner and outer walls. This parametric representation is swept out by two intrinsic spherical coordinates, u and v.

The extrinsic parameters of a1PosInner a1PosOuter rPosPosInner rPosPosOuter a2PosInner a2PosOuter rNegPosInner rNegPosOuter a1NegInner a1NegOuter rNegNegInner rNegNegOuter a2NegInner a2NegOuter rPosNegInner rPosNegOuter a3PosInner describe the general shape of the double hulled ellipsoid.

PosPosPosInner:

$X = \text{alpha Cos}[u](a1PosInner \text{ Cos }[v] + rPosPosInner \text{ Sin }[2\,v])$;

$Y = \text{alpha Cos}[u] \text{ Sin}[v](a2PosInner + rPosPosInner \text{ Sin}[v] + rPosPosInner \text{ Sin }[3\,v])$;

$Z = a3PosInner \text{ alpha Sin}[u]$;

NegPosPosInner:

$X = \text{alpha Cos}[u] \text{ Cos}[v](a1NegInner - rNegPosInner \text{ Cos}[v] + rNegPosInner \text{ Cos }[3\,v])$;

$Y = \text{alpha Cos}[u] \text{ Sin}[v](a2PosInner + rNegPosInner \text{ Sin}[v] + rNegPosInner \text{ Sin }[3\,v])$;

$Z = a3PosInner \text{ alpha Sin}[u]$;

NegNegPosInner:

$X = \text{alpha Cos}[u] \text{ Cos}[v](a1NegInner - rNegNegInner \text{ Cos}[v] + rNegNegInner \text{ Cos }[3\,v])$;

$Y = -(\text{alpha Cos}[u] \text{ Sin}[v](-a2NegInner + rNegNegInner \text{ Sin}[v] + rNegNegInner \text{ Sin }[3\,v]))$;

$Z = a3PosInner \text{ alpha Sin}[u]$;

PosNegPosInner:

$X = -(\text{alpha Cos}[u] \text{ Cos}[v](-a1PosInner - rPosNegInner \text{ Cos}[v] + rPosNegInner \text{ Cos }[3\,v]))$;

$Y = -(\text{alpha Cos}[u] \text{ Sin}[v](-a2NegInner + rPosNegInner \text{ Sin}[v] + rPosNegInner \text{ Sin }[3\,v]))$;

$Z = a3PosInner \text{ alpha Sin}[u]$;

PosPosNegInner:

$X = \text{alpha Cos}[u](1 + \text{alpha tapxPosInner Sin}[u])(a1PosInner \text{ Cos}[v] + rPosPosInner \text{ Sin }[2\,v])$;

$Y = \text{alpha Cos}[u](1 + \text{alpha tapyPosInner Sin}[u]) \text{ Sin}[v](a2PosInner + rPosPosInner \text{ Sin}[v] + rPosPosInner \text{ Sin }[3\,v])$;

$Z = a3NegInner \text{ alpha Sin}[u]$;

NegPosNegInner:

$X = \text{alpha Cos}[u] \text{ Cos}[v](a1NegInner - rNegPosInner \text{ Cos}[v] + rNegPosInner \text{ Cos }[3\,v])(1 + \text{alpha tapxNegInner Sin}[u])$;

$Y = \text{alpha Cos}[u](1 + \text{alpha tapyNegInner Sin}[u]) \text{ Sin}[v](a2PosInner + rNegPosInner \text{ Sin}[v] + rNegPosInner \text{ Sin }[3\,v])$;

$Z = a3NegInner \text{ alpha Sin}[u]$;

NegNegNegInner:

$X = \text{alpha Cos}[u] \text{ Cos}[v](a1NegInner - rNegNegInner \text{ Cos}[v] + rNegNegInner \text{ Cos }[3\,v])(1 + \text{alpha tapxNegInner Sin}[u])$;

$Y = -(\text{alpha Cos}[u](1 + \text{alpha tapyNegInner Sin}[u]) \text{ Sin}[v](-a2NegInner + rNegNegInner \text{ Sin}[v] + rNegNegInner \text{ Sin }[3\,v]))$;

$Z = a3NegInner \text{ alpha Sin}[u]$;

PosNegNegInner:

$X = -(\text{alpha Cos}[u] \text{ Cos}[v](-a1PosInner - rPosNegInner \text{ Cos}[v] + rPosNegInner \text{ Cos }[3\,v])(1 + \text{alpha tapxPosInner Sin}[u]))$;

$Y = -(\text{alpha Cos}[u](1 + \text{alpha tapyPosInner Sin}[u]) \text{ Sin}[v](-a2NegInner + rPosNegInner \text{ Sin}[v] + rPosNegInner \text{ Sin }[3\,v]))$;

$Z = a3NegInner \text{ alpha Sin}[u]$;

PosPosPosOuter:

2n $X = \text{alpha Cos}[u](a1PosOuter \text{ Cos}[v] + rPosPosOuter \text{ Sin }[2\,v])$;

$Y = \text{alpha Cos}[u] \text{ Sin}[v](a2PosOuter + rPosPosOuter \text{ Sin}[v] + rPosPosOuter \text{ Sin }[3\,v])$;

$Z = a3PosOuter \text{ alpha Sin}[u]$;

NegPosPosOuter:

$X = \text{alpha Cos}[u] \text{ Cos}[v](a1NegOuter - rNegPosOuter \text{ Cos}[v] + rNegPosOuter \text{ Cos }[3\,v])$;

$Y = \text{alpha Cos}[u] \text{ Sin}[v](a2PosOuter + rNegPosOuter \text{ Sin}[v] + rNegPosOuter \text{ Sin }[3\,v])$;

$Z = a3PosOuter \text{ alpha Sin}[u]$;

NegNegPosOuter:

$X = \text{alpha Cos}[u] \text{ Cos}[v](a1NegOuter - rNegNegOuter \text{ Cos}[v] + rNegNegOuter \text{ Cos }[3\,v])$;

$Y = -(\text{alpha Cos}[u] \text{ Sin}[v](-a2NegOuter + rNegNegOuter \text{ Sin}[v] + rNegNegOuter \text{ Sin }[3\,v]))$;

$Z = a3PosOuter \text{ alpha Sin}[u]$;

PosNegPosOuter:

$X = -(\text{alpha Cos}[u] \text{ Cos}[v](-a1PosOuter - rPosNegOuter \text{ Cos}[v] + rPosNegOuter \text{ Cos }[3\,v]))$;

$Y = -(\text{alpha Cos}[u] \text{ Sin}[v](-a2NegOuter + rPosNegOuter \text{ Sin}[v] + rPosNegOuter \text{ Sin }[3\,v]))$;

$Z = a3PosOuter \text{ alpha Sin}[u]$;

PosPosNegOuter:

$X = \text{alpha Cos}[u](1 + \text{alpha tapxPosOuter Sin}[u])(a1PosOuter \text{ Cos}[v] + rPosPosOuter \text{ Sin }[2\,v])$;

$Y = \text{alpha Cos}[u](1 + \text{alpha tapyPosOuter Sin}[u]) \text{ Sin}[v](a2PosOuter + rPosPosOuter \text{ Sin}[v] + rPosPosOuter \text{ Sin }[3\,v])$;

$Z = a3NegOuter \text{ alpha Sin}[u]$;

NegPosNegOuter:

X=alpha Cos [u] Cos [v](a1NegOuter−rNegPosOuter Cos [v]+
  rNegPosOuter Cos [3 v])(1+alpha tapxNegOuter Sin [u]);

Y=alpha Cos [u](1+alpha tapyNegOuter Sin [u]) Sin
  [v](a2PosOuter+rNegPosOuter Sin [v]+rNegPosOuter Sin [3 v]);

Z=a3NegOuter alpha Sin [u];

NegNegNegOuter:

X=alpha Cos [u] Cos [v](a1NegOuter−rNegNegOuter Cos [v]+
  rNegNegOuter Cos [3 v])(1+alpha tapxNegOuter Sin [u]);

Y=−(alpha Cos [u](1+alpha tapyNegOuter Sin [u]) Sin [v](−
  a2NegOuter+rNegNegOuter Sin [v]+rNegNegOuter Sin [3 v]));

Z=a3NegOuter alpha Sin [u];

PosNegNegOuter:

X=−(alpha Cos [u] Cos [v](−a1PosOuter−rPosNegOuter Cos [v]+
  rPosNegOuter Cos [3 v])(1+alpha tapxPosOuter Sin [u]));

Y=−(alpha Cos [u](1+alpha tapyPosOuter Sin [u]) Sin [v](−
  a2NegOuter+rPosNegOuter Sin [v]+rPosNegOuter Sin [3 v]));

Z=a3NegOuter alpha Sin [u];

Stage 1: User Initialization

In this stage, the user provides an approximation to the object of interest by approximately fitting the model to the data. The method for doing this depends on the topology of the object and the form of the parametric component. Here, a method for a left ventricle is described. Note that the approximation may be quite rough as the segmentation routine (Stage 2) will discover the exact object boundaries. In order for the segmentation routine to be effective, the initial model must be reasonably close, within 10 pixels for example.

Figure 6:
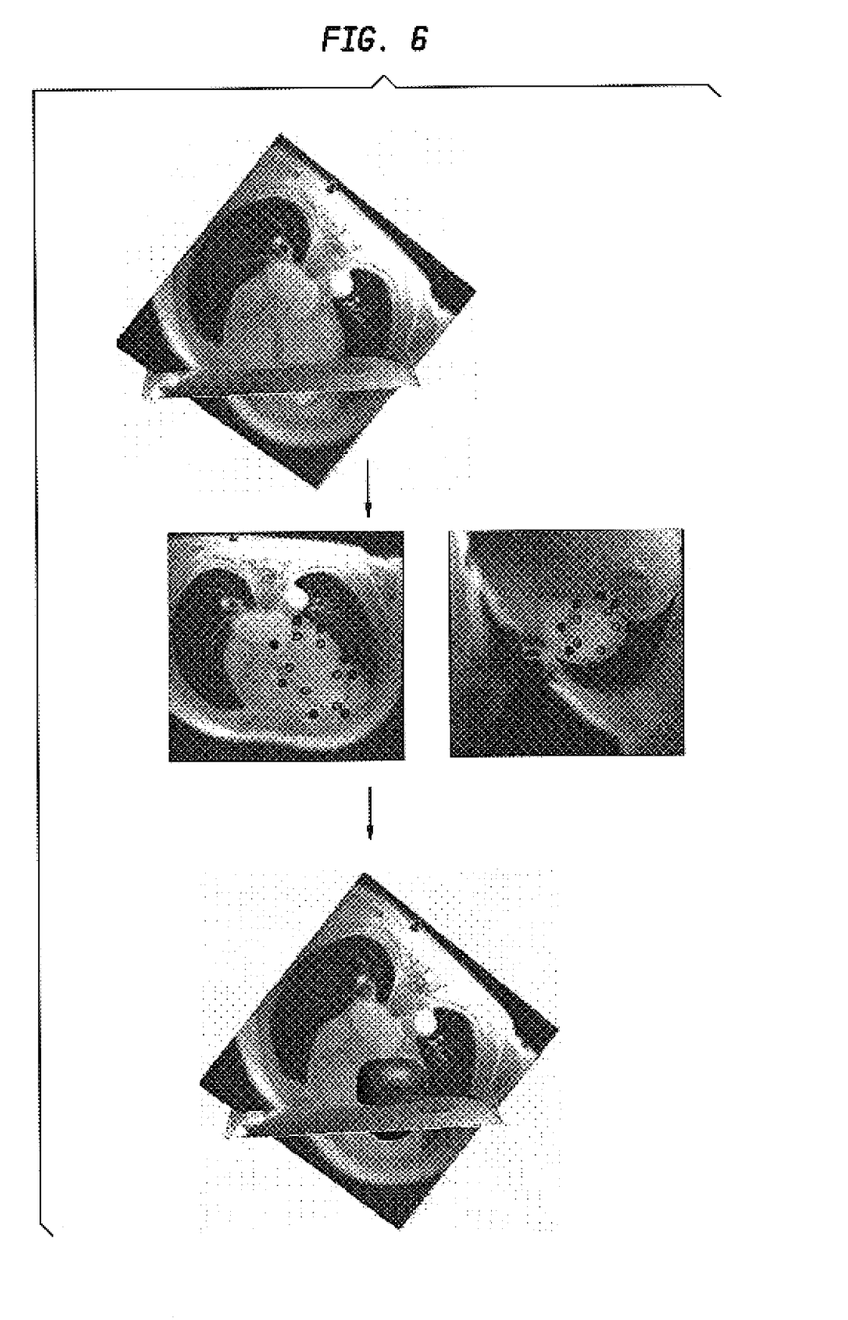
FIG. 6 shows the user selecting points on two orthogonal images to initially position the parametric component of the model.

The user defines points on the approximate border of the both the inner and outer (endocardial and epicardial) walls of the left ventricle for a cross-section. Then, in order to specify the general bounds of the shape, the user repeats this action on an orthogonal image. For the LV, these would be the short axis and long axis images. (FIG. 6).

Stage 2: 2D Optimal Active Contour Segmentation

The task of refining the contours is also known as segmentation. Here the segmentation module is described. It is given two approximate contours (endocardium and epicardium) from the previous step. These contours, however, do not exactly delineate the features in the image. The present invention seeks to refine the contours so that the endocardium exactly delineates the border between the myocardium and the blood pool, and the epicardium exactly delineates the border between the myocardium and the outside. See FIG. 7.

Figure 8:
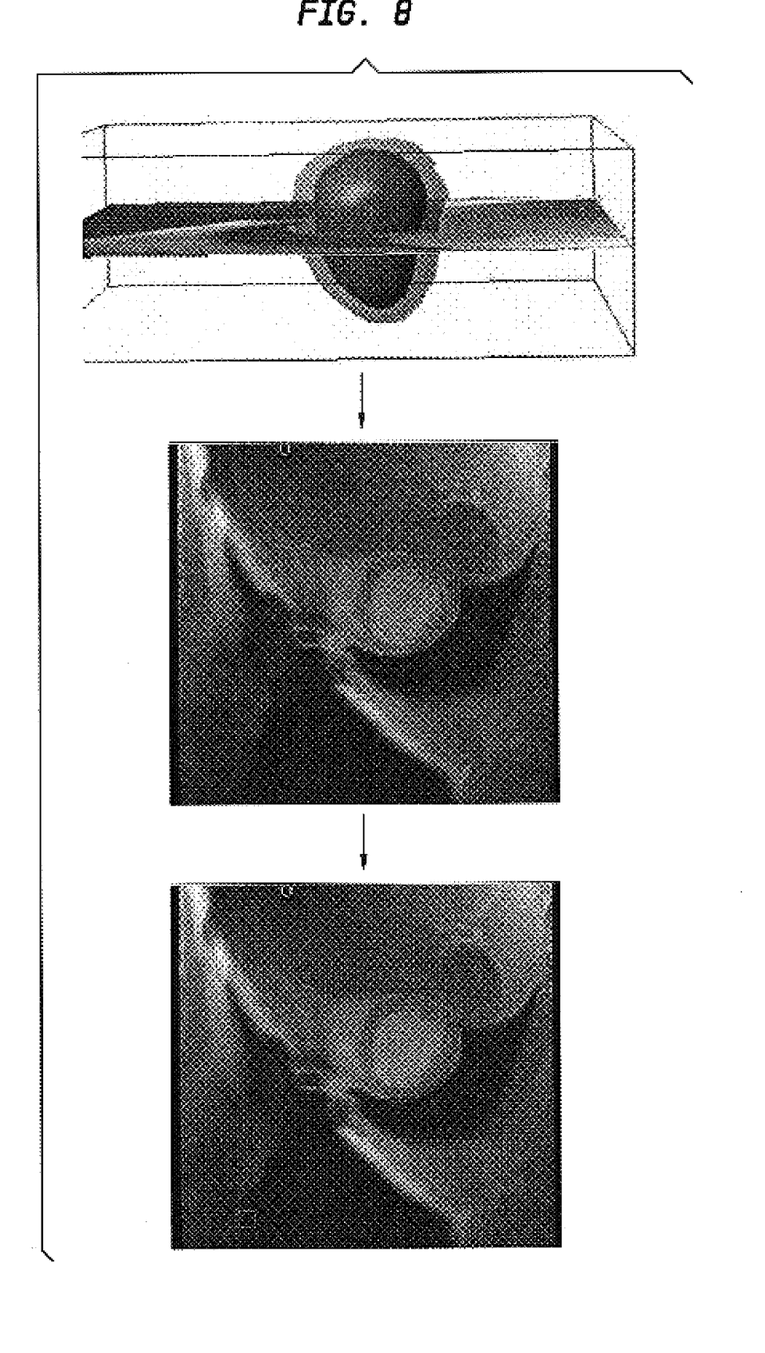
FIG. 8 shows the intersection of one image axis with the parametric component of the hybrid model. This intersection forms the starting point for a 2-D segmentation. The result of the segmentation is also shown.
Figure 9:
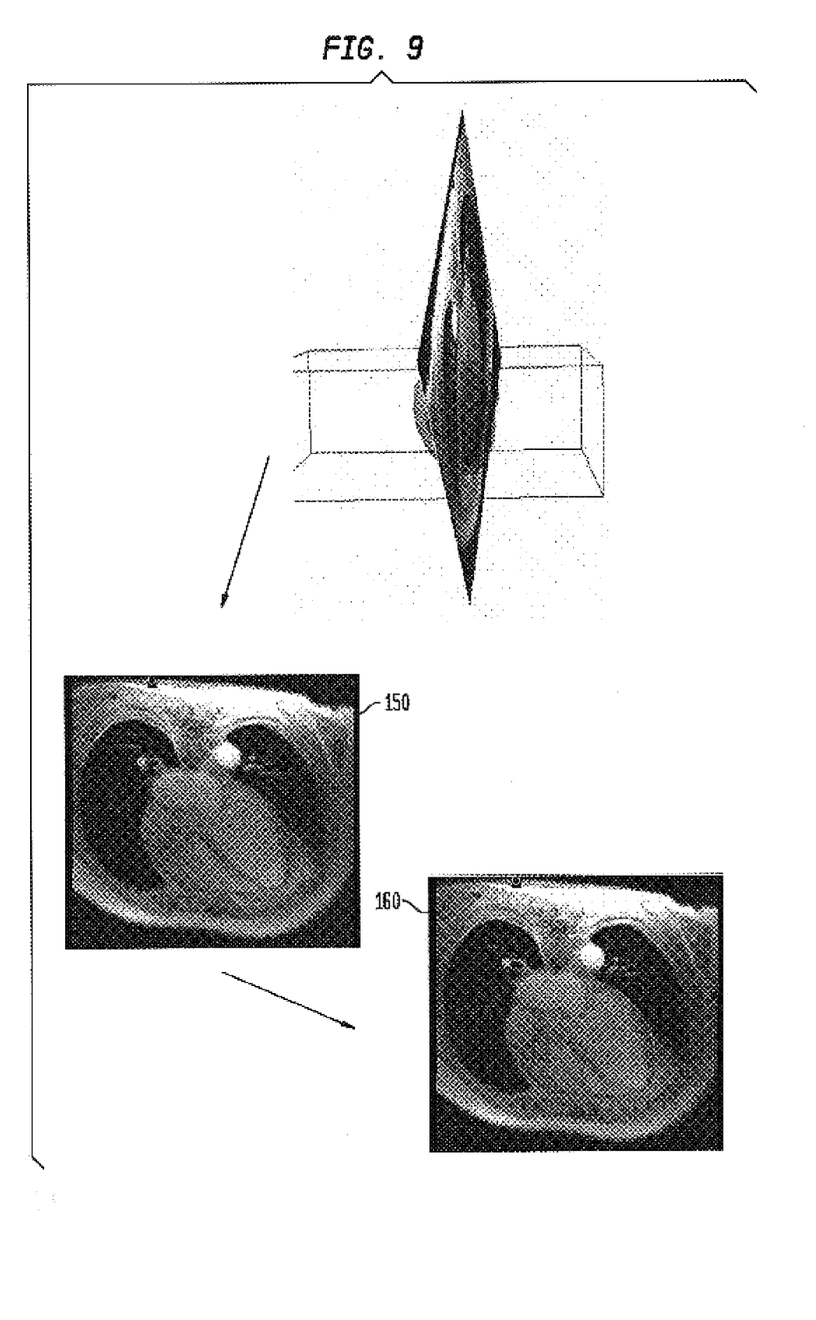
FIG. 9 shows the same process as FIG. 9 but for a different (orthogonal) axis.

FIGS. 8 and 9 also describe refining the contours following intersection of the model with the image from the approximate contour (150) to the recovered contour (160) as illustrated in FIG. 9.

The way to do this is to use active contours (snakes). Snakes were first proposed by Kass et al. (M. Kass, A. Witkin, and D. Terzopoulos, "Snakes: Active contour models", *International Journal of Computer Vision*, 2:321–331, 1988) are defined as contours that are pushed or pulled towards image features by constraining forces. An energy function based on the smoothness and curvature of the contours and the edge strength in the image along the contour. This energy function is to be minimized. Kass et al. Proposed to minimize the energy function using gradient descent. Amini et al. (A. A. Amini, T. E. Wemouth, and R. C. Jain, "Using dynamic programming for solving variational problems in vision", *IEEE Trans. Pattern Analysis and Machine Intelligence*, 12(9):855–867, 1990) used dynamic programming.

The present invention uses an algorithm similar to Geiger et al. (D. Geiger, A. Gupta, L. A. Costa, and J. Vlontzos, "Dynamic programming for detecting, tracking, and matching deformable contours", *IEEE Trans. Pattern Analysis and Machine Intelligence*, 17(3):294–302, 1995), but using Dijktra's graph search algorithm as in Mortensen and Barrett (E. N. Mortensen and W. A. Barrett, "Interactive segmentation with intelligent scissors", *Graphical Models and Image Processing*, 60:349–384, 1998).

Dijkstra's algorithm is a standard graph theory algorithm and can be found in any algorithm's book such as (G. Brassard and P. Bratley, *Algorithmics: Theory & Practice*, Prentice Hall, 1988). The present system involves creating a graph by defining a node for every pixel in the image. Nodes that correspond to neighboring pixels are connected by a link whose weight is inversely proportional to the gradient in the image between the corresponding pixels. Then, given a source node, Dijkstra's algorithm is able to find the minimum path between the source node and all nodes in a set of sink nodes. Since the cost of a path is the sum of the cost of the links it goes through, the minimum path corresponds to the contour with maximum gradient. If one is not sure on the starting point, then one can define a set of source nodes and connect all of them to a "pseudo" source node with a zero cost link.

Figure 7:
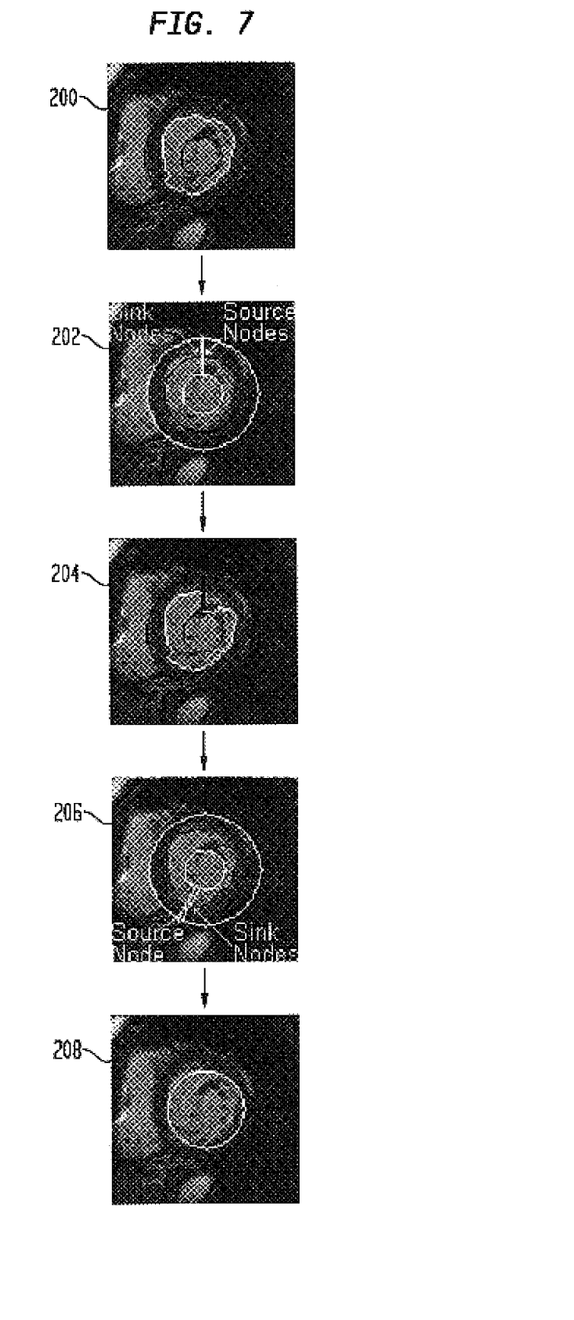
FIG. 7 illustrates the technique for refining the contours segmentation.

Reference is made to the illustrative steps of the algorithm with an example (see FIG. 7). Block 200 shows an image of the left ventricle in a short axis cross section and an approximate contour for the endocardium.

In the first step the method of the present system defines a search space of a given width (say 10 pixels) around the approximate contour 202(a). Then, a contiguous set of nodes is defined as the source nodes. Since the contour is closed, it does not really matter which nodes are defined as source nodes as long as they cut the search space like a sector. Their neighbors on one side are also defined as the sink nodes (see block 202).

The present system runs Dijkstra's algorithm to find the minimum cost path between the "pseudo" source node and the sink nodes. This generates a contour, but nothing in the algorithm guarantees that it is closed, and most of the time, it is not (see block 204).

So another set of source and sink points in the same search space is defined. The source node is uniquely defined as the mid-point of the previously recovered contour. The sink nodes are its neighbors on one side (see block 206) and Dijkstra's algorithm is called again. The recovered contour is guaranteed to be closed since the source and sink nodes are defined to be connected (see block 208).

In the case of the heart left ventricle, both contours are segmented independently. For the endocardium, the cost of a link between two nodes is defined as:

$$e_1(p_1, p_2) = \begin{cases} \dfrac{1}{\|\nabla I(p_2)\|^2 + \varepsilon} & \text{if } z \geq 0 \\ 1/\varepsilon & \text{otherwise} \end{cases} \quad \text{where} \begin{pmatrix} 0 \\ 0 \\ z \end{pmatrix} = \begin{pmatrix} x_2 - x_1 \\ y_2 - y_1 \\ 0 \end{pmatrix} \times \begin{pmatrix} \cos(\vec{\nabla} I(p_2)) \\ \sin(\vec{\nabla} I(p_2)) \\ 0 \end{pmatrix}$$

For the epicardium, it is defined as:

$$e_2(p_1, p_2) = \frac{1}{\|\nabla I(p_2)\|^2 + \varepsilon}$$

Here, $\|\nabla I\|$ is the gradient magnitude and $\vec{\nabla} I$ is the gradient direction in the image, $\epsilon$ is a small constant to bound the energy function. In this case, the contour is built clockwise by the Dijkstra process and the image gradient points from bright to dark. By testing whether the sign of the z component of the cross product between the image gradient and the contour direction is positive, and setting the energy to a large number otherwise, the contour is forced to separate a bright region inside from a dark region outside.

Stage 3: 3D Hybrid Model Fit

Figure 10:
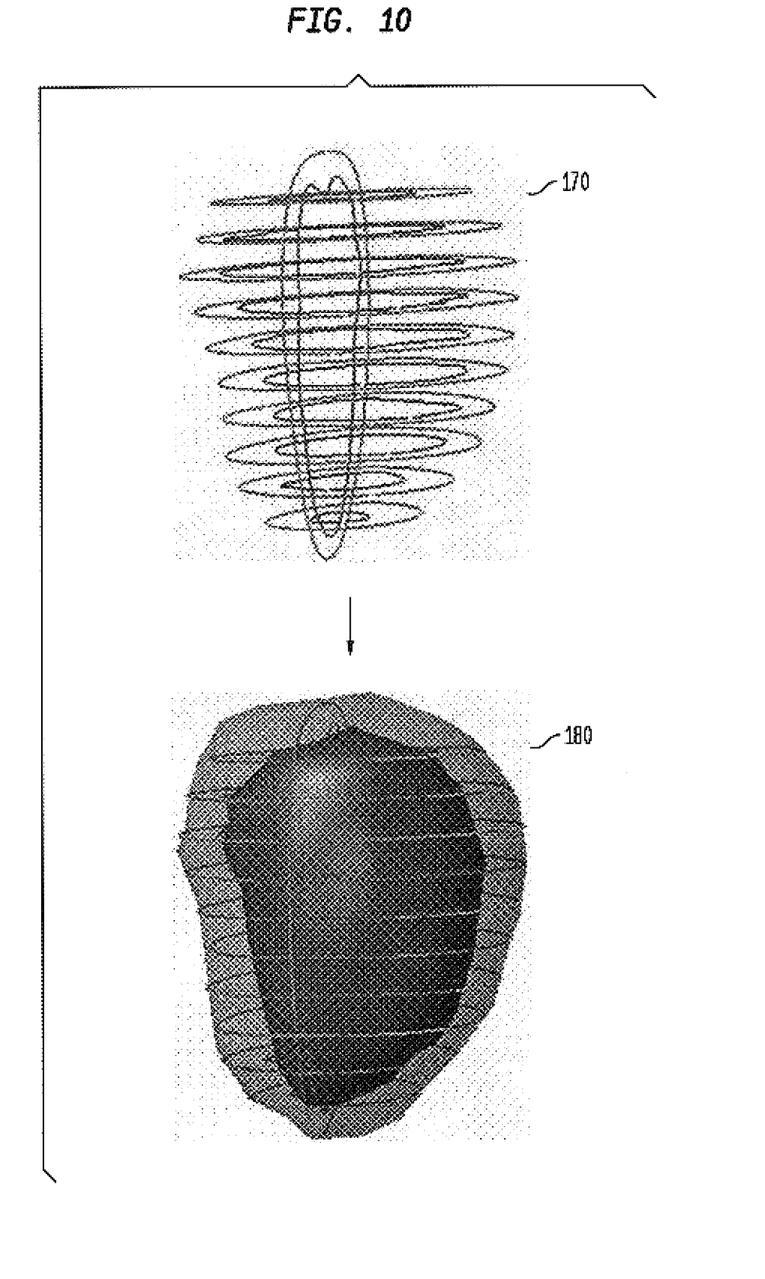
FIG. 10 shows the contours resulting from the 2-D segmentations in space and the hybrid model fit to them.

The initial approximation is fit to the object structure provided by the user in Stage 1 to the sampled segmented data garnered from Stage 2 (FIG. 10, 170). The method employed is an iterative closest point method based on the physically-motivated recovery paradigm. In this paradigm, data points are thought of as exerting forces attracting the model towards them. A hybrid model is capable of rigid, parametric and local (spline-like) deformations. Local deformations may include a deformation penalty which serves to smooth the data. Finite element model (FEM) shape functions are used to distribute the data forces from element surfaces to element nodes. Both the data forces and smoothing forces are scaled, and the data forces are combined with the smoothing forces. The rigid and parametric fitting is discontinued once the local deformations are initiated. The result is shown in FIG. 10, 180.

Typically, in hybrid model recovery rigid body characteristics (translation and rotation) are adjusted until they settle. Then, rigid body characteristics and the parametric component are fit. And, once they settle, the rigid body characteristics, the parametric component and the local component are fit. The present method is different from this standard scheme by freezing the rigid body characteristics and parametric component during the local model fit. The rationale is that if the parametric component is to provide a gross description of the data it should arrive at the same result irrespective of the presence of a local component. In addition, freezing the rigid body characteristics and parametric component during the local model fit, speeds the fitting process significantly.

Experimental Results

The technique was tested on a volunteer data set with two phases of the cardiac cycle, En-diastole (ED) and en-systole (ES). The blood pool volume for ED was 271 ml with a myocardial volume of 275 ml. For ES, the blood volume was 231 ml with a myocardial volume of 285 ml. The ejection fraction for the volunteer was 14%.

While certain embodiments have been shown and described, it is distinctly understood that the invention is not limited thereto but may be otherwise embodied within the scope of the appended claims.

What is claimed is:

1. In an image processing system, a method of modeling a three dimensional target object, varying in shape between different operational phases and represented by a plurality of cross-sectional images, to provide a representative corresponding dynamic three dimensional model, comprising the steps of:

for a first shape of said target object corresponding to a first position of the target object during its operational phase, approximately superimposing an initial model upon said target object, the initial model estimating a position of an inner and outer wall of the target object;

for each of said plurality of cross-sectional images,
determining an intersection contour of said initial model and a cross-sectional image of said target object;
refining said determined intersection contour to more closely delineate said target object; and
dynamically adjusting said initial model toward said refined determined intersection contour to provide a representative three dimensional model of said target object in motion; and for a second shape of said target object, said second shape of said target object representing said target object at a second position during its operational phase,
repeating the previous steps; and for subsequent shapes of the target object, each subsequent shape representing said target object at a subsequent position during its operational phase, repeating the previous steps until the target object has reached a desired position in the operational phase.

2. A method according to claim 1 including the step of
selecting said initial model from a plurality of available initial models by identifying an initial model most closely fitting said target object.

3. A method according to claim 2, including the step of
identifying said initial model most closely fitting said target object by positioning and rotating an image representing said initial model to most closely align with an image representing said target object.

4. A method according to claim 1 wherein said step of refining said determined intersection contour includes the step of
applying image processing functions to image data points representing said determined intersection contour to provide points representing a contour more closely delineating said target object.

5. A method according to claim 4 wherein said image processing functions include a 2-D segmentation algorithm.

6. A method according to claim 1 including the step of
employing said representative three dimensional model of (a) said target object first shape and (b) said target object second shape or said target object subsequent shape, in determining at least one of, (i) volume difference between said first and second shapes, (ii) strain on said target object and (iii) a suitable replacement for said target object.

7. A method according to claim 1 wherein
said three dimensional target object varies in shape, between said first shape and said second shape and said subsequent shapes associated with corresponding operational phases, on a substantially periodic basis.

8. A method according to claim 1 wherein said three dimensional target object is a section of a heart.

9. A method according to claim 1 wherein said three dimensional target object is a body organ.

10. A method according to claim 1 wherein said different operational phases comprise at least one of (a) different phases of heart operation, (b) different movement phases of a skeletal structure, (c) different states of an anatomical organ.

11. A method according to claim 1 including the step of
employing a scale factor to weight data locations from said sub-sampled contour dataset in refining said determined intersection contour to more closely delineate said target object.

12. A method according to claim 1 including the step of selecting an initial model from a plurality of available initial models by identifying an initial model based on physical similarity to said target object.

13. A method according to claim 1 wherein after said step of approximately superimposing an initial model upon said target object, said method of claim 9 is performed automatically for a target object without User entry of data.

14. In an image processing system, a method of modeling a three dimensional target object, varying in shape between different operational phases and represented by a plurality of cross-sectional images, to provide a representative corresponding dynamic three dimensional model, comprising the steps of:

for a first shape of said target object corresponding to a first position of the target object during its operational phase,
approximately superimposing an initial model upon said target object, the initial model estimating a position of an inner and outer wall of the target object;

for each of said plurality of cross-sectional images,
determining an intersection contour of said initial model and a cross-sectional image of said target object;
refining said determined intersection contour to more closely delineate said target object;
sub-sampling points representing said refined determined intersection contour to provide a sub-sampled contour dataset; and
dynamically adjusting said initial model toward said sub-sampled contour to provide a representative three dimensional model of said target object in motion; and for a second shape of said target object, said second shape of said target object representing said target object at a second position during its operational phase,
repeating the previous steps; and for subsequent shapes of the target object, each subsequent shape representing said target object at a subsequent position during its operational phase,
repeating the previous steps until the target object has reached a desired position in the operational phase.

15. A method according to claim 14 including the step of employing said representative three dimensional model of (a) said target object first shape and (b) said target object second shape or said target object subsequent shape, in determining at least one of, (i) volume difference between said first and second shapes, (ii) strain on said target object and (iii) a suitable replacement for said target object.

16. A method according to claim 14 including the step of selecting an initial model from a plurality of available initial models by identifying an initial model based on physical similarity to said target object.

17. A method according to claim 14 wherein said three dimensional target object is a section of a heart.

18. A method according to claim 14 wherein said three dimensional target object is a body organ.

19. A method according to claim 14 wherein said different operational phases comprise at least one of (a) different phases of heart operation, (b) different movement phases of a skeletal structure, (c) different states of an anatomical organ.

20. A method according to claim 14 including the step of employing a scale factor to weight data locations from said sub-sampled contour dataset in refining said determined intersection contour to more closely delineate said target object.

21. A method according to claim 14 wherein after said step of approximately superimposing an initial model upon said target object, said method of claim 15 is performed automatically for a target object without User entry of data.

* * * * *